United States Patent [19]
Rio

[11] Patent Number: 5,344,193
[45] Date of Patent: Sep. 6, 1994

[54] SPRINKLER HEAD WATER DAMAGE CONTROL DEVICE

[75] Inventor: Gerald J. Rio, Amston, Conn.

[73] Assignee: Rite Line Incorporation, Tolland, Conn.

[21] Appl. No.: 914,792

[22] Filed: Jul. 16, 1992

[51] Int. Cl.⁵ ............................................. F16L 35/00
[52] U.S. Cl. ........................................ 285/8; 169/91;
 248/80; 239/121; 4/255.04; 137/312; 141/337
[58] Field of Search ............... 239/120, 121, 104, 124;
 169/90, 91, 37; 4/225.04, 225.05, 225.06;
 184/1.5, 106; 137/312; 248/80, 75; 141/337;
 285/8

[56] References Cited

U.S. PATENT DOCUMENTS

| | | | |
|---|---|---|---|
| 1,228,320 | 5/1917 | Guillot | 4/255.04 X |
| 1,646,942 | 10/1927 | Tuorto | 285/8 X |
| 1,941,065 | 12/1933 | Williamson | 4/255.05 |
| 3,608,098 | 9/1971 | Andrisani | 4/255.04 |
| 3,967,643 | 7/1976 | Lutringer | 285/8 X |
| 4,098,398 | 7/1978 | Meyer | 220/573 X |
| 4,756,480 | 7/1988 | Fish | 4/255.06 |
| 4,883,102 | 11/1989 | Gabrielyan et al. | 141/65 X |
| 5,099,872 | 3/1992 | Tarvin et al. | 141/337 |

FOREIGN PATENT DOCUMENTS 484400  6/1952  Canada .................. 4/255.05

*Primary Examiner*—Randolph A. Reese
*Assistant Examiner*—Heather Chun
*Attorney, Agent, or Firm*—McCormick, Paulding & Huber

[57] ABSTRACT

A cup shaped collector mounted at one end of an elongate telescopically adjustable pole defines a water receiving chamber for receiving and containing at least a portion of an open sprinkler head and collecting water discharged from the open head. An elongate flexible hose connected to the collector communicates with the water receiving chamber and diverts water from the open head to a friendly location. Fluorescent markings on the collector aid in manually positioning the collector to receive the open head under conditions of darkness.

19 Claims, 3 Drawing Sheets

SPRINKLER HEAD WATER DAMAGE CONTROL DEVICE

BACKGROUND OF THE INVENTION

This invention relates in general to a device for controlling water damage resulting from accidental operation of a sprinkler head.

In a high-rise building equipped with a sprinkler system there is an ever present risk of water damage resulting from accidental operation of a sprinkler head. The damage resulting from such occurrence is usually quite substantial in the immediate area of the open sprinkler head and may extend to several floors below. The valve for shutting-down the sprinkler system or at least that portion of the system which includes the open head may be located a substantial distance from the open head. Even when qualified building maintenance personnel are present at the scene, it may be a considerable time before the problem can be brought under control.

Such a sprinkler system usually include some type of water flow alarm to indicate when the system is in operation. When a fire department responds to a sprinkler alarm the usual procedure is to locate the shut-off valve and shut-down the sprinkler system, at least until the condition can be temporarily corrected. A ladder is usually required to gain access to the open head, which may be located high overhead, so that the open head can be temporarily closed using a wedge or other appropriate means. The fire fighter on the ladder is required to work under adverse conditions and is exposed to fatigue and possible risk of injury.

Accordingly, it is the general aim of the present invention to provide a light-weight, durable device which is easy to use and store and which will control water damage resulting from an open sprinkler head without compromising the sprinkler system.

SUMMARY OF THE INVENTION

In accordance with the present invention a sprinkler head water damage control device comprises collecting means defining a water receiving chamber for receiving and containing at least a portion of an open sprinkler head and collecting water discharged from the open head, positioning means for manually locating the collecting means in an operative position wherein at least a portion of the open sprinkler head is located within the water receiving chamber, and draining means communicating with the water receiving chamber for diverting water received within the chamber to a selected location remote from the collecting means.

DETAILED DESCRIPTION OF PREFERRED EMBODIMENT

Figure 1:
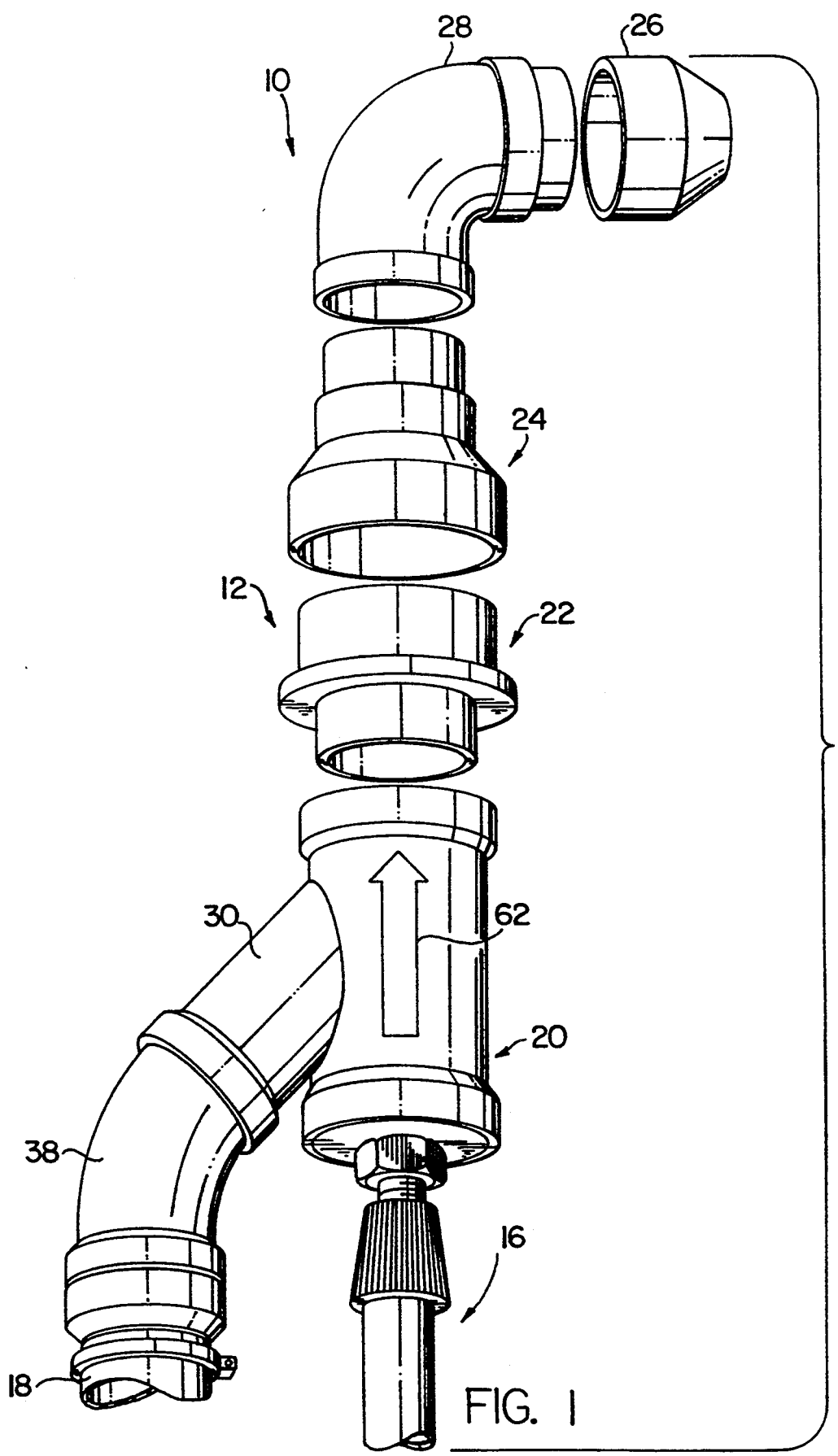
FIG. 1 is a fragmentary exploded perspective view of a device embodying the invention.

Turning now to the drawings, a sprinkler head water damage control device embodying the present invention is indicated generally by the reference numeral 10. The illustrated device 10 essentially comprises a collector assembly indicated generally at 12 which defines a water receiving chamber 14 for receiving and containing a portion of an open sprinkler head and collecting water discharged from the open head. The collector assembly 12 is mounted in fixed position at one end of an axially elongate pole assembly, indicated generally at 16, for manually positioning the device in an operative position wherein an open sprinkler head to be brought under control is located within the water receiving chamber 14. An elongate flexible hose of indeterminate length, indicated by the numeral 18, is attached to the collector assembly 12 in communication with the chamber 14 for diverting water received within the chamber to a selected friendly location remote from the collector assembly. A wide variety of sprinkler heads are presently in use. Consequently, the water damage control device of the present invention is constructed and arranged so that it may be adapted to control accidental water discharge from sprinkler heads of most types, all of which will be hereinafter more fully described.

Considering now the device 10 in further detail, the collector assembly 12 comprises a plurality of separable, releasably connected collector elements arranged for assembly in diverse ways to accommodate sprinkler heads of various types. The collector assembly may be made from any suitable material and may take various forms. However, the presently preferred assembly is made from a non-metallic material and comprises a plurality of plastic pipe fittings releasably connected together in plugging frictional engagement with each other. Specifically, and as best shown in FIG. 1, the collector assembly 12 includes a collector body, indicated generally at 20, a concealed head adapter, designated generally by the numeral 22, a universal adapter indicated generally at 24, an end cap, indicated generally at 26, and an elbow 28.

Figure 3:
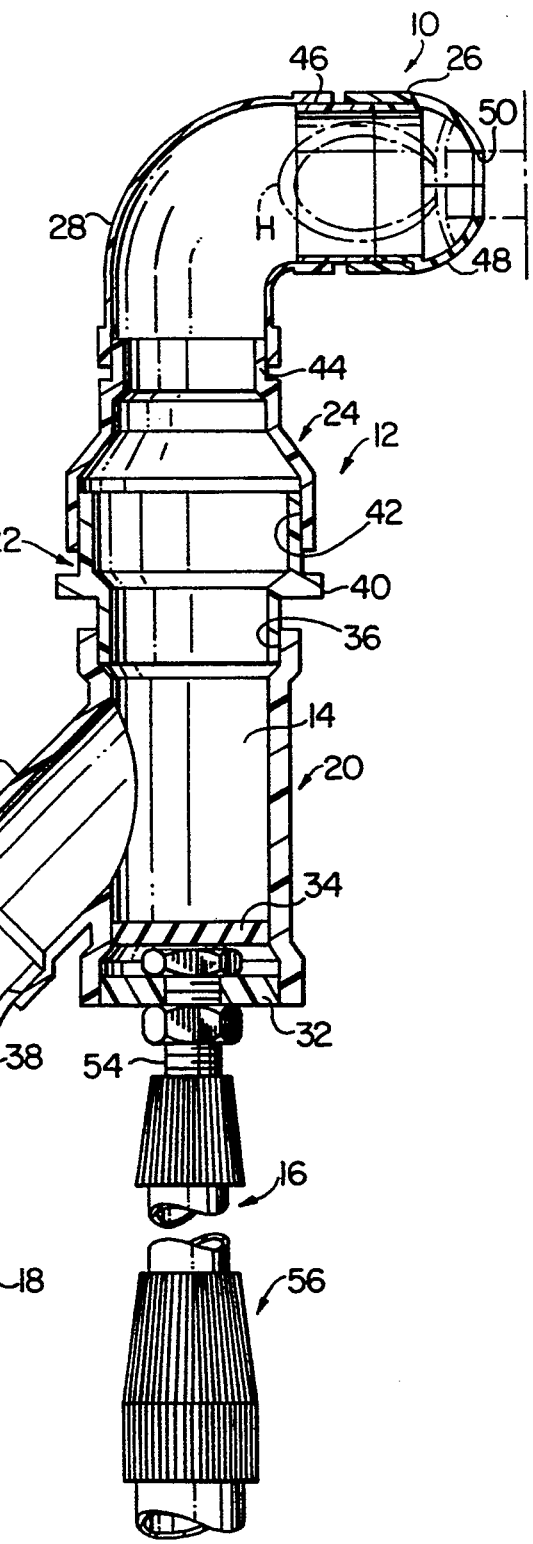
FIG. 3 is a axially sectional view through the device shown set up to receive a horizontally mounted sprinkler head.

The body 20 which is formed from a standard plumbing fitting has a generally cylindrical interior surface partially defining the water receiving chamber 14. A forty five degree angle branch 30 which forms an integral part of the body 20 communicates with the chamber 14, as best shown in FIG. 3. A plug 32 mounted in fixed position in the lower end of the body 20 forms a closure for the lower end of the body and a means for attaching the body 20 to the pole 16, as will be hereinafter further discussed. An elastomeric plug 34 sealed within the lower end of the body 20 above the plug 32 defines the lower end of the chamber 14. The upper end of the body 20 defines a smooth walled generally cylindrical socket 36. A forty five degree angle elbow 38 mounted in fixed position within the lower end of the branch 30, as best shown in FIG. 3, provides connection with the drain hose 18 which communicates with the chamber 14.

The concealed head adapter 22 comprises a generally cylindrical fitting having a cylindrical portion at its lower end, as it appears in FIG. 3, sized for frictional plugging engagement within the socket 36. The upper end of the adapter 22 is diametrically enlarged, substantially as shown in FIG. 3. An annular flange 40 coaxially surrounds a central portion of the adapter 22, substantially as shown, for a purpose which will be hereinafter evident.

Further referring to FIG. 3, the universal adapter 24 defines a cylindrical socket 42 for receiving the upper end portion of the adapter 22. The adapter 24 also has a cylindrical upper end portion 44, the outside diameter of which is substantially equal to the diameter of the socket 36. A ninety degree elbow 28 is connected to the upper end of the universal adapter 24, substantially as shown.

Figure 5:
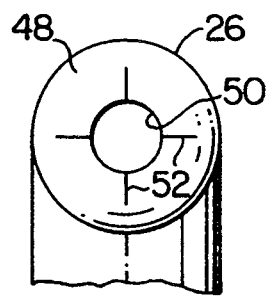
FIG. 5 is a fragmentary end view of the device shown in FIG. 3.

The end cap 26 is releasably connected to the opposite or free end of the elbow 28 by an integral cylindrical connecting member 46 having an outside diameter substantially equal to the diameter of the socket 36. The end cap 26 carries a dome shaped resilient elastomeric element 48 which has a generally cylindrical central opening 50 best shown in FIG. 5. The opening 50 has a diameter substantially equal to the outside diameter of a supporting pipe for a sprinkler head, such as the horizontally mounted head H shown in FIG. 3. A plurality of radially disposed slits 52, 52 formed in the elastomeric element 48 allow a sprinkler head, such as the head H, to pass through the opening 50 and through the element 48.

Figure 4:
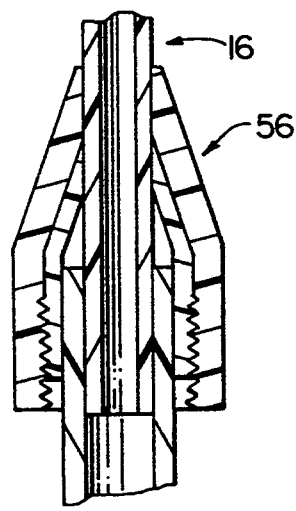
FIG. 4 is a somewhat enlarged fragmentary axial sectional view through the pole assembly.

The pole assembly 16 comprises an axially elongate telescopically extendable aluminum/fiberglass pole which has a threaded stud 54 mounted at its upper end as it appears oriented in the drawings. The stud 54 passes through an opening in the plug 32 and is secured to the collector assembly 12 by a pair of opposing nuts, as best shown in FIG. 3. Typical telescopically connected pole sections which comprise the pole assembly 16 are releasably clamped in selected positions of adjustment by a collet of a well known type, best shown in FIG. 4 and indicated generally by the numeral 56.

Figure 7:
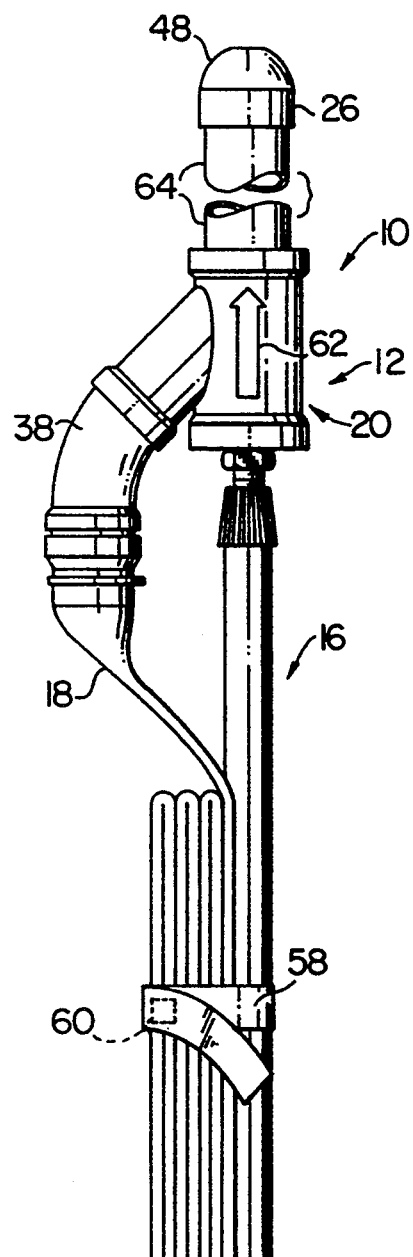
FIG. 7 is a fragmentary sectional view showing the device set up to receive a pendent sprinkler head, the drain hose being shown in storage position.

The flexible hose 18 may be made from any suitable material, such as rubberized cotton or plastic and is attached to the fitting 38, substantially as shown in FIG. 3, to channel water away from the water receiving chamber 14. The lightweight hose 18 is preferably provided in a twenty five foot length, but additional lengths may be added, as necessary. Preferably, and as shown, the hose 18 has a storage position wherein it is folded onto itself alternately in one and an opposite direction to form a generally rectangular package as shown in FIG. 7 wherein the hose package is positioned adjacent the pole assembly 16. The hose is fastened in its storage position by a flexible strap 58 attached to the pole assembly 16, as shown in FIG. 7. The free ends of the strap 58 are preferably connected by associated mating patches of Velcro or a like fastening material to facilitate quick release, the location of the Velcro patches is being indicated at 60 in FIG. 7.

Preferably, and as shown, the collector assembly body 20 has an indicator 62 to aid in manually positioning the collector assembly in it operative position under conditions of darkness. The presently preferred indicator 62 comprises one or more strips of fluorescent material adhered to the body 20, one such strip 62 being shown in the drawings. Alternatively, a part of the collector body or, if desired, the entire collector assembly may be coated with fluorescent material.

In FIG. 3 the device 10 is shown in a fully assembled condition, that is having all of the collector elements which comprise the collector assembly 12 connected in assembled relation to each other. As shown, the device is set up to control the accidental flow of water from an open sprinkler head of a horizontal type, that is a sprinkler head such as the head H which projects horizontally from a vertical wall or the like.

Figure 6:
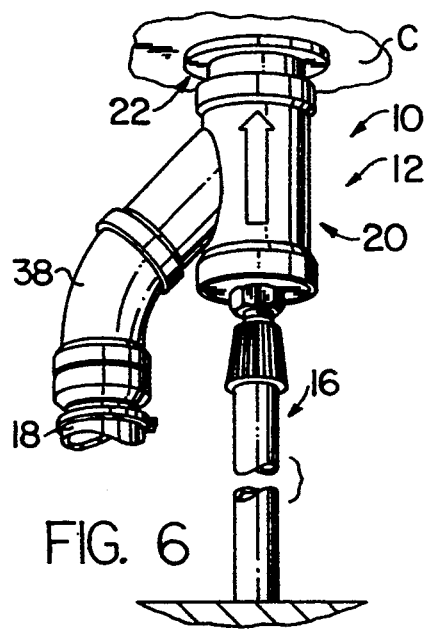
FIG. 6 is a fragmentary perspective view and shows the device set up to receive a concealed sprinkler head.

Preparatory to use, the extendable pole assembly 16 is adjusted to a convenient length which facilitates access to the open head. The hose 18 is released from its storage position of FIG. 7 by pulling on the free end of the strap 58. The free end of the hose is then carried to a friendly location which may be remote from the open head H. Such a friendly location may, for example, be a sink, toilet or stair tower where the water may be allowed to flow freely from the hose 18 without risk of damage to the surroundings. The collector assembly is manually manipulated using the pole assembly 16 to locate the sprinkler head H within the chamber 14 defined by the collector assembly 12. When the device 10 is in its operative position it may be releasably secured in that position by extending the pole 16 until the lower end of the pole abuts the floor below the sprinkler head as shown in FIG. 6 where the floor surfaces is indicated by the letter S. Thus, the pole assembly 16 serves both as a means for positioning the device and releasably securing it in an operative position.

After the water has been brought under control it may be allowed to continue to flow through the device to a safe location so that the integrity of the sprinkler system will be retained until proper repair or replacement of the open head may be effected.

Referring now to FIG. 6, the device is shown set-up to control accidental water flow from a concealed sprinkler head, that is a head located above a covered opening in a ceiling C to prepare the device for such usage the universal adapter 24, elbow 28 and end cap 26 are removed from the adapter 22, as it appears in FIG. 3. When accidental operation of a sprinkler head of the concealed type occurs the cover for the ceiling opening usually falls from the ceiling exposing the opening and allowing the head, or at least the deflector portion of the head to drop through the ceiling opening and to a position below the surface of the ceiling. The open head is brought under control by moving the adapter 22 to an operative location wherein the head or at least that portion of the head below the ceiling is captured within the ceiling adapter 22. The upper portion of the adapter 22 is then moved upwardly through the hole in the ceiling until the flange 40 engages the surface of the ceiling. The device may then be secured in place by further extending the pole assembly 16 until the lower end of the pole assembly rests upon the floor.

Figure 2:
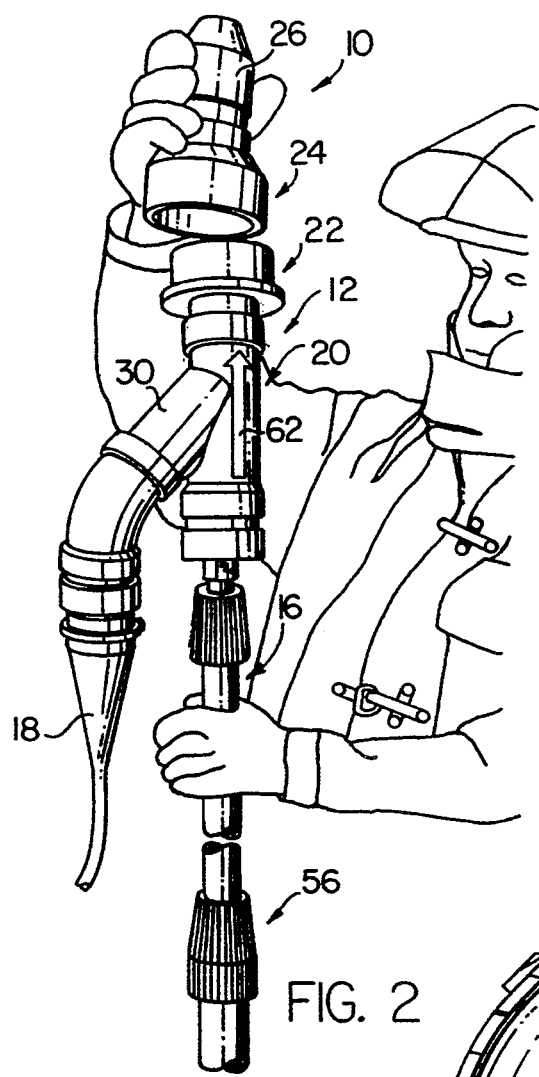
FIG. 2 is a somewhat reduced fragmentary perspective view showing a device embodying the present invention being set up to control water discharge from a pendent sprinkler head.

In FIG. 2 the device is shown being prepared to control water flow from a pendent sprinkler, that is a sprinkler which depends from a ceiling or other overhead support. It will be noted that the elbow 28 has been removed and the end cap 26 releasably connected to the upper end of the universal adapter 24 which is being reassembled with the ceiling adapter 22.

An alternate arrangement of the collector elements to control flow from an open pendent sprinkler is shown in FIG. 7 wherein the end cap 26 is connected to a tubular extension 64 which is, in turn, connected to the collector body 20. The end cap 26 may also be releasably connected directly to the collector body.

Figure 8:
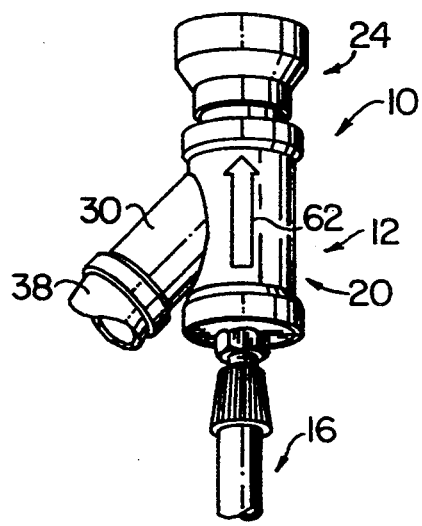
FIG. 8 is a fragmentary perspective view and shows the device set up to receive a sprinkler heads of any other types.

In FIG. 8 the device 10 is shown set up with the universal adapter 24 in place. The universal adapter enables the device to be used with sprinkler heads of most other types as, for example, a pendent sprinkler of the type which is covered by a protective basket, such as often found in a warehouse or like building where sprinkler heads may be exposed to accidental contact.

The device 10 is a lightweight tool designed for duty while taking no more room on fire apparatus than average pike poles. The device virtually eliminates the need for a step ladder and thereby reduces the risk of fatigue and injury to the fire fighter.

I claim:

1. A sprinkler head water damage control device comprising collecting means defining a water receiving chamber for receiving and containing at least a portion of an open sprinkler head and collecting water discharged from the open sprinkler head, positioning means for manually moving said collecting means to and releasably retaining said collecting means in an operating position wherein at least a portion of the open sprinkler head is located within said water receiving chamber, said positioning means including an axially elongate adjustable pole of variable axial length, said collecting means being mounted directly at one end of said pole, and draining means communicating with said water receiving chamber for diverting water received within said chamber to a selected location remote from said collecting means.

2. A sprinkler head water damage control device as set forth in claim 1 wherein said pole comprises a telescopically adjustable pole.

3. A sprinkler head water damage control device as set forth in claim 1 wherein said draining means comprises an elongate flexible hose.

4. A sprinkler head water damage control device as set forth in claim 3 wherein said hose has a storage position wherein it is folded onto itself alternately in one direction and in an opposite direction forming a package generally adjacent said positioning means and said device includes fastening means for securing said package to said positioning means.

5. A sprinkler head water damage control device as set forth in claim 4 wherein said fastening means comprises a flexible strap.

6. A sprinkler head water damage control device as set forth in claim 1 wherein said collector means comprises a collector body defining said water receiving chamber and a collector adapter releasably connected to said collector body and selected from a plurality of collector adapters for accomodating sprinkler heads of differing types.

7. A sprinkler head water damage control device as set forth in claim 6 wherein the open sprinkler head projects in a generally horizontal direction from a vertical wall and said collector adapter comprises an elbow.

8. A sprinkler head water damage control device as set forth in claim 6 wherein said collector adapter comprises an end cap having a resilient elastomeric element.

9. A sprinkler head water damage control device as set forth in claim 8 wherein said elastomeric element includes means for allowing the passage of an open sprinkler head therethrough and for cooperating with the open sprinkler head to seal said water receiving chamber.

10. A sprinkler head water damage control device as set forth in claim 6 wherein the sprinkler head comprises a concealed sprinkler head generally disposed above a ceiling having an opening therethrough below the sprinkler head and said collector adapter comprises an annular flange for engaging a portion of the ceiling surrounding the ceiling opening.

11. A sprinkler head water damage control device as set forth in claim 10 wherein said collector adapter includes a sleeve for extending through the ceiling opening and said flange surrounds said sleeve.

12. A sprinkler head water damage control device as set forth in claim 6 wherein said collector adapter comprises an axially elongate tubular extension member.

13. A sprinkler head water damage control device as set forth in claim 6 wherein said collector adapter forms a longitudinal extension of said body and defines a portion of said chamber having a transverse cross sectional area greater than the transverse cross sectional area of the remainder of said chamber.

14. A sprinkler head water damage control device as set forth in claim 1 including indicating means for aiding in the manual positioning of said collecting means in said operating position under conditions of darkness.

15. A sprinkler head water damage control device as set forth in claim 14 wherein said indicating means comprises fluorescent indicia carried by said collecting means.

16. A sprinkler head water damage control device as set forth in claim 1 wherein said water receiving chamber comprises a generally cylindrical chamber and said collecting means is mounted on said pole with said cylindrical chamber in coaxially alignment with said pole.

17. A sprinkler head water damage control device as set forth in claim 16 wherein said collecting means comprises a pipe fitting.

18. A sprinkler head water damage control device for use in combination with a concealed sprinkler head disposed above a ceiling having an opening therethrough below the sprinkler head comprising collecting means defining a water receiving chamber for receiving and containing at least a portion of an open sprinkler head and collecting water discharged from the open sprinkler head and including a collector assembly having elements including a collector body, one of the collector elements having an annular flange for engaging a portion of the ceiling surrounding the ceiling opening, manual positioning means for moving said collecting means to an operating position wherein at least a portion of the open sprinkler head is located within said water receiving chamber, and draining means communicating with said collector body for diverting water received within said chamber to a selected location remote from said collecting means.

19. A sprinkler head water damage control device comprising a telescopically adjustable pole of axially variable length, a collector body directly mounted on one end of said pole and defining a water receiving chamber for receiving and containing at least a portion of an open sprinkler head, a flexible drain hose connected to said collector in communication with said chamber for diverting water received within said chamber to a selected location remote from said chamber, said drain hose having a storage position wherein said hose is folded onto itself alternately in one and an opposite direction and fastening means for releasably retaining said hose in its storage position.

* * * * *